Dec. 4, 1928. 1,693,839
F. FAUDI
METHOD OF JOINTING TUBULAR MEMBERS
Original Filed March 10, 1924
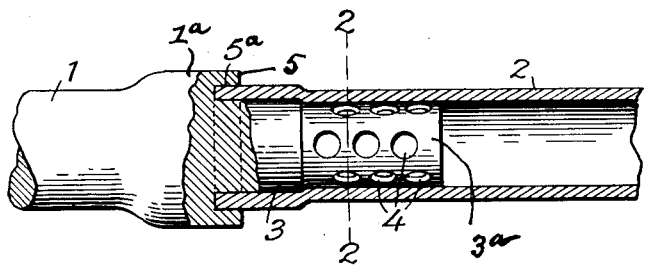
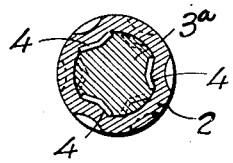
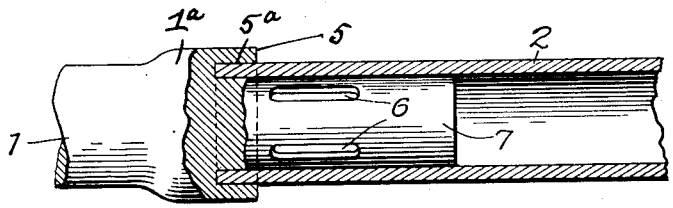
INVENTOR:
Fritz Faudi,
BY Paul E. Schilling,
ATTORNEY.

Patented Dec. 4, 1928.

1,693,839

UNITED STATES PATENT OFFICE.

FRITZ FAUDI, OF DUSSELDORF-OBERKASSEL, GERMANY.

METHOD OF JOINTING TUBULAR MEMBERS.

Original applications filed March 10, 1924, Serial No. 698,054, and November 3, 1925, Serial No. 66,653, and in Germany July 4, 1922. Divided and this application filed December 20, 1926. Serial No. 156,040.

My invention relates to an improved method of making joints for shafts, connecting rods and the like, wherein two members, one fitted within the other, are to be permanently connected, and the present application is a division of my prior applications Serial No. 698,054, filed March 10, 1924, and Serial No. 66,653, filed November 3, 1925.

The object of the present invention is to provide a method of forming joints which will be durable and will readily withstand the blows and vibrations of rough usage without loosening or becoming disabled.

The invention resides in a method of joining an outer tubular member to an inner member having surface depressions by forcing the outer member with a press fit upon the inner member and then pressing portions of the wall of the outer member into the said surface depressions of the inner member, whereby said members are firmly bound together.

Further, the invention resides in the novel steps and arrangement of steps hereinafter described and claimed, reference being had to the accompanying drawing, wherein:

Figure 1 is an elevation partly in section showing a joint formed by my improved method.

Figure 2 is a sectional view taken on line 2—2 of Figure 1.

Figure 3 is a view similar to Figure 1 showing a modification.

Referring more in detail to the accompanying drawing, the numeral 1 designates an "inner" member and 2 an "outer" member, the latter being tubular and having its inner diameter slightly smaller, at least, than the outer diameter of the inner member 1, whereby the former will require expansion to make it fit over the inner member. This form of joint is exemplified in Figures 1 and 2, wherein the tubular member 2 is forced with a press fit over the cylindrical end portions or extensions 3 and 3ª of the member 1 while both parts are cold, so that the tubular member may have a desired refinement or finish. The cylindrical portion or extension 3 of member 1 is here shown as having depressions or recesses 4 into which portions of the material or wall of the tubular member are forced at opposing points, as by means of a stamp, the press fit and interlocking connections thus produced serving to hold the two members firmly united against any possibility of separation.

As shown in Figure 1, the part 1ª of the body of the member 1 is made of larger diameter than the portion 3 at its point of intersection therewith, and such portion of the body is provided with an annular axial flange 5 which lies concentric with and in spaced relation to the portion 3 so as to form an intervening annular groove 5ª. The end edge of the member 2 which fits over upon the portions 3 and 3ª extends into this groove and is surrounded by the the flange 5, which is compressed into engagement therewith so as to closely embrace the end of the member 2 and protect the same from being torn or otherwise injured. In forming the joint, the end of the member 2 is forced, as set forth, with a press fit over upon the portions 3 and 3ª of member 1 with its edge projecting into the said groove, the member 2 is then subjected to the action of suitable means whereby portions of its wall are displaced into the depressions 4, and then the flange 5 is compressed about the end edge of the member 2. The two operations of forcing portions of the wall of member 2 into the depressions 4 and compressing the flange 5 may be performed simultaneously, if desired.

In the modification shown in Figure 3 the member 1 is provided with a cylindrical portion or extension 7 of uniform diameter and is provided with elongated, axially extending, peripheral grooves 6 into which the material of the tubular member is forced, as in the embodiment of Figures 1 and 2, thereby forming a rigid connection between the two parts. The construction and mode of operation, with the exceptions noted, is the same in Figure 3 as in Figures 1 and 2, and the two members of the joint are united in the same manner.

The effect of the construction and method of forming the joint is to provide a joint composed of an inner member and an outer member, telescoped one within the other, wherein said members are so firmly united as to furnish a joint which is durable and will readily withstand the blows and vibrations of rough usage, without loosening or becoming disabled, and which at the same time admits of the manufacture of such joints in a convenient manner and at a comparatively low cost.

Having thus fully described my invention, I claim:—

1. The method of jointing an outer tubular member to an inner member, which consists in forming the inner member with two portions of different diameters, the one of lesser diameter having surface depressions and being of a cross-section slightly larger than the inner cross-section of the tubular outer member and the one of greater diameter having an annular flange surrounding and forming a groove between it and the portion of lesser diameter, fitting the outer member with a press fit on the portion of lesser diameter of the inner member with an end portion thereof projecting beneath said flange and into said groove, pressing portions of the wall of the outer member into the said surface depressions of the inner member, and compressing the flange of the inner member about the edge of the outer member extending into the groove.

2. The method of jointing an outer tubular member to an inner member, which consists in forming the inner member with two portions of different diameters, the one of lesser diameter having surface depressions and the one of greater diameter having an annular flange surrounding and forming a groove between it and the portion of lesser diameter, fitting an outer member on the portion of lesser diameter of the inner member with an end portion thereof projecting beneath said flange and into said groove, pressing portions of the wall of the outer member into the said surface depressions of the inner member, and compressing the flange of the inner member about the edge of the outer member extending into the groove.

3. The method of jointing an outer tubular member to an inner member, which consists in forming the inner member with two portions of different diameters, the one of lesser diameter having surface depressions and being of a cross-section slightly larger than the inner cross-section of the tubular outer member and the one of greater diameter having an annular flange surrounding and forming a groove between it and the portion of lesser diameter, expanding the outer member while both members are cold onto the portion of lesser diameter of the inner member with an end portion of said outer member projecting beneath said flange and into said groove, stamping portions of the wall of the outer member into said surface depressions of the inner member, and compressing the flange of the inner member about the edge of the outer member extending into the groove.

4. A joint comprising an inner member having two portions of different diameters, the one of lesser diameter being provided with surface depressions and the one of greater diameter having an annular flange surrounding and forming a groove between it and the portion of lesser diameter, and a tubular outer member normally of an internal diameter slightly less than the portion of lesser diameter of the inner member, said outer tubular member having a gripping fit upon said portion of lesser diameter of the inner member by expansion fit thereon and being provided with projections engaging the surface depressions of the inner member and having an end portion projecting beneath said flange and into said groove, said flange being compressed about the said end portion of said outer member.

In testimony whereof I affix my signature.

FRITZ FAUDI.